SYNTHESIS OF ALUMINUM BORATE WHISKERS

John K. Alley, Andersonville, and Robert C. Johnson, Norris, Tenn., assignors to the United States of America as represented by the Secretary of the Interior
No Drawing. Filed Jan. 19, 1965, Ser. No. 426,696
5 Claims. (Cl. 23—59)

ABSTRACT OF THE DISCLOSURE

Production of aluminum borate whiskers by reacting together boron oxide vapor, water vapor and aluminum halide vapor.

---

The invention herein described and claimed may be manufactured and used by or for the Government of the United States of America for governmental purposes without the payment of royalties thereon or therefor.

This invention is concerned with preparation of aluminum borate whiskers.

Whiskers of aluminum borate are highly refractory, elastic, strong, single crystals which are useful in many applications such as reinforcement of ablatives, composites, as felted insulating pads, boards and paper, as loose fill thermal insulation, etc. Previous production of aluminum borate whiskers by crystallization from molten solutions did not yield whiskers of desirable length and fineness.

It has now been found that long, fine whiskers of aluminum borate may be produced by reaction of aluminum halides in the vapor state with water vapor and boron oxide vapor. The following equation is believed to represent the overall reaction involved in formation of the products of the invention.

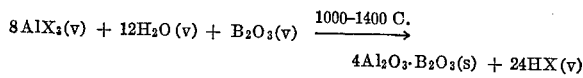

$$8AlX_3(v) + 12H_2O(v) + B_2O_3(v) \xrightarrow{1000-1400\ C.} 4Al_2O_3 \cdot B_2O_3(s) + 24HX(v)$$

Aluminum fluoride has been found to be particularly effective and convenient in preparation of the aluminum borate whiskers of the invention. This reaction is most conveniently carried out by maintaining a molten mixture of $AlF_3$, $B_2O_3$ and $Na_2B_4O_7$ at a temperature of about 1000° to 1400° C. for a period of time sufficient to form the desired length and amount of whiskers. The function of the sodium tetraborate, $Na_2B_4O_7$, is to lower the vaporization rate of the $AlF_3$ and also to prevent excessive contact of water vapor with the molten $AlF_3$. Water vapor is supplied by the furnace atmosphere. At the reaction temperature the $AlF_3$ is volatilized and in the vapor form is hydrolyzed by water vapor in the furnace atmosphere to form $Al_2O_3$ and HF. The $Al_2O_3$ then reacts with $B_2O_3$, also volatile at the temperature of reaction, to form the aluminum borate whiskers of the invention.

Optimum time and temperature in the process of the invention may vary over a considerable range and are best determined experimentally. The temperature must, of course, be sufficient to volatilize the essential reactants, $AlF_3$ and $B_2O_3$. A range of about 1000° to 1400° C. has generally been found satisfactory.

Periods of time varying from about 1 hour to 36 hours are satisfactory. The highest rate of whisker growth has generally been found to occur in the first 3 hours of firing.

Whiskers exceeding 25 mm. in length have been obtained by the process of the invention and they have usually been found to grow around the rims and outside top edges of the reaction vessel.

Water vapor concentration in the furnace atmosphere is important in determining the rate of whisker growth and the crystal habit. Insufficient water vapor may considerably slow the growth of the whiskers, whereas excessive amounts may cause the formation of a hard crust of thick aluminum borate crystals, $AlF_3$, $B_2O_3$ and sodium borate. Again, optimum amounts are best determined experimentally. However, dewpoints of from about 45° F. to 80° F. have been found satisfactory, with a dewpoint of about 65° F. seemingly being optimum for most experimental arrangements.

Flow rate of air through the furnace may also vary considerably, e.g. about 10 ml./min. to 500 ml./min. However, very slow rates generally give the best whisker growth. Flow rates in the examples below were regulated by raising or lowering the pedestal on which the crucible was supported in the furnace, slowest rates being obtained by sealing the bottom of the furnace chamber around the furnace pedestal with asbestos rope, thus permitting air to enter the furnace at only a very slow rate.

Although the reaction mixture of $AlF_3$, $B_2O_3$ and $Na_2B_4O_7$ has been found to give particularly desirable results, the invention is not limited to these ingredients. $AlCl_3$ or $AlBr_3$ may be substituted for $AlF_3$ if they are added to the reaction chamber as vapors. This requires the use of vapor generators (outside the furnace) since $AlCl_3$ and $AlBr_3$ vapor pressures are higher at lower temperatures than is that of $AlF_3$. Accordingly, if they were heated along with $B_2O_3$ and $Na_2B_4O_7$ (in the same crucible) they would either volatilize or hydrolyze at low temperatures before the proper reaction temperature was reached. Use of $AlCl_3$ and $AlBr_3$ would, however, have the advantages that specific rates of vapor introduction to the reaction zone could be maintained by use of external generators and gaseous exhaust fumes would contain HCl or HBr instead of the more dangerous HF vapor resulting from use of $AlF_3 \cdot AlF_3$ may also be generated outside the reaction vessel and introduced to the hot reaction chamber in controlled concentrations and at controlled rates.

Other alkali borates such as $K_2B_4O_7$, $KBO_2$, $KB_5O_8$, $Li_2B_4O_7$, $LiBO_2$ and $NaBO_2$ could be used in place of the $Na_2B_4O_7$, although the $Na_2B_4O_7$ has been found to give very good results and is readily available and inexpensive.

The mole ratio of aluminum halide to alkali borate to boron oxide is not critical and optimum values may vary considerably with different reactants and reactant conditions. A range of mole ratios of the three ingredients of from about 8 to 4 to 3 to about 8 to 1.5 to 1 has been found satisfactory, particularly when the aluminum halide is the fluoride.

The invention will be more specifically illustrated by the following examples.

Example 1

Batch materials:

| | Grams used |
|---|---|
| 8.0 $AlF_3$ (purified) | 33.59 |
| 1.0 $B_2O_3$ (glass) | 3.48 |
| 3.0 $Na_2B_4O_7$ | 30.19 |
| Total | 67.26 |

The raw materials were mixed by shaking well in a glass bottle. They were then placed in a 100 ml. platinum crucible (without lid) and fired in a platinum wound vertical tube furnace at 1,400° C. for 12 hours. The furnace contained a ⅜″ diameter Alundum tube in the top for exhaust of gases. Fresh water vapor from the atmosphere was furnished by the natural slow air draft through the furnace. The sample was placed in and removed from the furnace maintained at 1,400° C.

After removal of the crucible from the furnace about 1 gram of coarse whiskers ¾″ long were observed around the top edge of the crucible. X-ray analysis showed their identity to be approximately $4Al_2O_3 \cdot B_2O_3$.

*Example 2*

Same conditions and procedure as used in Example 1, except the firing temperature was 1,300° C.

Results.—About ¼ gram of fine aluminum borate whiskers up to about 1" in length had grown inward from the rim of the platinum crucible. X-ray showed approximately $4Al_2O_3 \cdot B_2O_3$.

*Example 3*

Same conditions and procedure as used in Example 1, except the firing temperature was 1,200° C.

Results.—About 0.1 gram of very fine aluminum borate whiskers up to 1 cm. in length had grown around the crucible rim. X-ray showed about $4Al_2O_3 \cdot B_2O_3$.

*Example 4*

Same conditions and procedure as used in Example 1, except the firing temperature was 1,100° C.

Results.—About 0.15 gram of very fine aluminum borate ($4Al_2O_3 \cdot B_2O_3$) whiskers up to about 1 cm. in length had grown around the crucible rim.

What is claimed is:

1. A process for preparation of aluminum borate whiskers comprising reacting together water vapor, boron oxide vapor and an aluminum halide vapor selected from the group consisting of aluminum fluoride vapor, aluminum bromide vapor and aluminum chloride vapor; and recovering said aluminum borate whiskers as product from said reaction.

2. The process of claim 1 in which the reaction is carried out at a temperature of from about 1000° C. to about 1400° C.

3. The process of claim 2 in which the aluminum halide is aluminum fluoride.

4. The process of claim 3 in which a mixture of aluminum fluoride, boron oxide and an alkali borate in a reaction vessel are fired in a furnace at a temperature sufficient to cause formation of vapors of the aluminum fluoride and boron oxide and cause a reaction between the vapors of aluminum fluoride, boron oxide and water vapor in the furnace atmosphere.

5. The process of claim 4 in which the alkali borate is sodium tetraborate.

References Cited

UNITED STATES PATENTS

| 2,118,143 | 5/1938 | Benner et al. | 23—59 X |
| 3,080,242 | 3/1963 | Berry | 23—59 X |
| 3,130,008 | 4/1964 | Stokes et al. | 23—142 X |
| 3,164,442 | 1/1965 | Bommer et al. | 23—59 |

OTHER REFERENCES

Baumann et al.: "Journal of The American Ceramic Soc.," Volume 25, October 1942, pages 391–394.

Johnson et al.: "Bureau of Mines Report of Investigations 6575," Bureau of Mines, 1965, page 14.

MILTON WEISSMAN, *Primary Examiner.*

OSCAR R. VERTIZ, *Examiner.*

H. T. CARTER, *Assistant Examiner.*